United States Patent
Han et al.

(10) Patent No.: US 9,526,033 B2
(45) Date of Patent: Dec. 20, 2016

(54) METHOD AND DEVICE FOR REDUCING HANDOVER SIGNALING

(71) Applicant: Huawei Technologies Co., Ltd., Shenzhen, Guangdong (CN)

(72) Inventors: Jihai Han, Shanghai (CN); Xiaoke Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/318,914

(22) Filed: Jun. 30, 2014

(65) Prior Publication Data

US 2014/0315552 A1    Oct. 23, 2014

Related U.S. Application Data

(63) Continuation of application No. PCT/CN2013/072071, filed on Mar. 1, 2013.

(30) Foreign Application Priority Data

Apr. 19, 2012    (CN) .......................... 2012 1 0115838

(51) Int. Cl.
   *H04W 36/00*   (2009.01)
   *H04W 48/20*   (2009.01)
   *H04W 52/02*   (2009.01)

(52) U.S. Cl.
   CPC ......... *H04W 36/0005* (2013.01); *H04W 48/20* (2013.01); *H04W 52/0235* (2013.01); *Y02B 60/43* (2013.01); *Y02B 60/50* (2013.01)

(58) Field of Classification Search
   CPC ........................... H04W 36/30; H04W 84/045
   USPC ....... 455/439, 437, 140, 436, 441, 444, 434, 455/450, 422.1, 552.1; 370/331, 252, 315, 370/230, 329, 343, 32, 241.1, 336, 328, 370/225, 216, 349
   See application file for complete search history.

(56) References Cited

U.S. PATENT DOCUMENTS

| 2010/0120429 A1* | 5/2010 | Kazmi et al. ................. 455/436 |
| 2010/0232327 A1* | 9/2010 | Kim et al. .................... 370/311 |
| 2010/0317345 A1* | 12/2010 | Futaki ............... H04W 36/0055 455/436 |

(Continued)

FOREIGN PATENT DOCUMENTS

| CN | 101595752 A | 12/2009 |
| CN | 101606420 A | 12/2009 |

(Continued)

*Primary Examiner* — Kiet Doan

(57) ABSTRACT

Embodiments of the present invention disclose a method and network side device for reducing handover signaling. The method includes: determining, by a network side device, a handover frequency of an inactive user equipment in a first preset time; and when the handover frequency is larger than or equal to a predetermined threshold, sending, by the network side device, a message to the inactive user equipment, so that the inactive user equipment enters a radio resource control idle state. In solutions of the embodiments of the present invention, when a handover frequency reaches a certain value, a user equipment is set to an RRC idle state; therefore, the quantity of handover signaling during a movement process of an inactive user equipment may be reduced, and an overhead of handover signaling is reduced, thereby reducing power consumption of the user equipment and improving power saving performance of the user equipment.

13 Claims, 1 Drawing Sheet

(56) References Cited

U.S. PATENT DOCUMENTS

| | | | |
|---|---|---|---|
| 2010/0323710 A1* | 12/2010 | Chen | H04W 74/004 |
| | | | 455/450 |
| 2011/0026484 A1 | 2/2011 | Fox et al. | |
| 2011/0207465 A1* | 8/2011 | Dwyer | H04W 76/046 |
| | | | 455/450 |
| 2013/0064107 A1* | 3/2013 | Sridhar | H04W 24/02 |
| | | | 370/252 |
| 2013/0128791 A1 | 5/2013 | Futaki et al. | |

FOREIGN PATENT DOCUMENTS

| | | |
|---|---|---|
| CN | 101868008 A | 10/2010 |
| CN | 102665245 A | 9/2012 |
| WO | WO 2008/095935 A1 | 8/2008 |

* cited by examiner

METHOD AND DEVICE FOR REDUCING HANDOVER SIGNALING

CROSS-REFERENCE TO RELATED APPLICATIONS

This application is a continuation of International Application No. PCT/CN2013/072071, filed on Mar. 1, 2013, which claims priority to Chinese Patent Application No. 201210115838.6, filed on Apr. 19, 2012, both of which are hereby incorporated by reference in their entireties.

TECHNICAL FIELD

The present invention relates to the field of communications, and in particular, to a method and device for reducing an overhead of handover signaling of a user equipment (User Equipment, UE).

BACKGROUND

With the development of modern communication technologies, in order to meet requirements for new data services, 3GPP starts standardization work of a long term evolution (Long Term Evolution, LTE) technology. The LTE technology greatly improves a data transmission rate and spectrum utilization of a system, and supports a maximum bandwidth of 20 MHz; in the bandwidth, a downlink peak rate of a cell may reach 100 Mbps, and an uplink peak rate may reach 50 Mbps.

Discontinuous reception (Discontinuous Reception, DRX) is one of important technologies in an LTE system, and mainly aims to save power for a UE. When a UE is in a DRX state, the UE may discontinuously intercept a physical layer downlink control channel (Physical Downlink Control Channel, PDCCH) channel, and when the user equipment UE does not intercept the PDCCH channel, the UE selectively shuts down a transceiver, so as to achieve an objective of power saving.

With the development of communication technologies, a user has an increasingly higher requirement for a data service, and with the popularization of intelligent terminals, a ratio of the intelligent terminals to the user equipments is also greatly increased. An intelligent terminal is more sensitive to terminal power consumption, and to ensure that a user equipment has longer standby time has become a focus of attention of operators and terminal manufacturers. A DRX mechanism may bring better power saving performance for a terminal, and therefore has become one of important characteristics focused by operators and terminal companies.

SUMMARY

Embodiments of the present invention provide a method and device for reducing handover signaling, so as to reduce a handover of an inactive user.

In one aspect, an embodiment of the present invention provides a method for reducing handover signaling, where the method includes: determining, by a network side device, a handover frequency of an inactive user equipment in a first preset time; and when the handover frequency is larger than or equal to a predetermined threshold, sending, by the network side device, a message to the inactive user equipment, so that the inactive user equipment enters a radio resource control idle state.

In another aspect, an embodiment of the present invention provides a network side device, where the device includes: a handover frequency determining unit, configured to determine a handover frequency of an inactive user equipment in a first preset time; and a state control unit, configured to: when the handover frequency determining unit determines that the handover frequency is larger than or equal to a predetermined threshold, send a message to the inactive user equipment, so that the inactive user equipment enters a radio resource control idle state.

In the solutions of the embodiments of the present invention, when a handover frequency reaches a certain value, a user equipment is set to an RRC idle state; therefore, the quantity of handover signaling during a movement process of an inactive UE may be reduced, and an overhead of handover signaling is reduced, thereby reducing power consumption of the UE and improving power saving performance of the UE.

BRIEF DESCRIPTION OF THE DRAWINGS

To describe the technical solutions in the embodiments of the present invention more clearly, accompanying drawings required for describing the embodiments are briefly introduced in the following. Apparently, the accompanying drawings in the following description merely show some embodiments of the present invention, and persons of ordinary skill in the art may further obtain other drawings according to these accompanying drawings without creative efforts.

DETAILED DESCRIPTION

The technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

It should be noted that, for the sake of simplicity, an LTE system is taken for description in the following embodiments. However, persons skilled in the art should understand that the solutions in the embodiments of the present invention are not limited thereto but may be correspondingly applied in other communication systems, such as a universal mobile telecommunications system (Universal Mobile Telecommunications System, UMTS) and a global system for mobile communications (Global System for Mobile Communications, GSM).

Currently, in a communication system, a UE inactivity timer (UE Inactivity Timer) controls switching of a UE from a radio resource control (Radio Resource Control, RRC) connection state to an RRC idle state, and a synchronization-to-out-of-synchronization timer (Sync2unsync Timer) determines switching of the UE from a synchronization state to an out-of-synchronization state. When the UE transfers no data packet in a time range set by the UE inactivity timer, a base station switches the UE to the RRC idle state, while whenever the UE transfers a data packet once, the base station restarts the UE inactivity timer for re-timing.

In the communication system, if a value of the UE inactivity timer is set too long, because the UE enters the RRC idle state only when receiving or sending no data packet in the long time range, it is not easy for the UE to enter the RRC idle state, but the UE stays in the RRC connection state all the time. In this case, the UE stays in the RRC connection state all the time, and handover signaling interaction is performed each time when the UE enters, from one cell, another cell, so if the UE moves at a boundary of the cell or moves at a high speed, more handover signaling interaction may exist, and therefore the UE has more power consumption.

Therefore, according to an embodiment of the present invention, a method for reducing handover signaling in an LTE system is provided.

Figure 1:
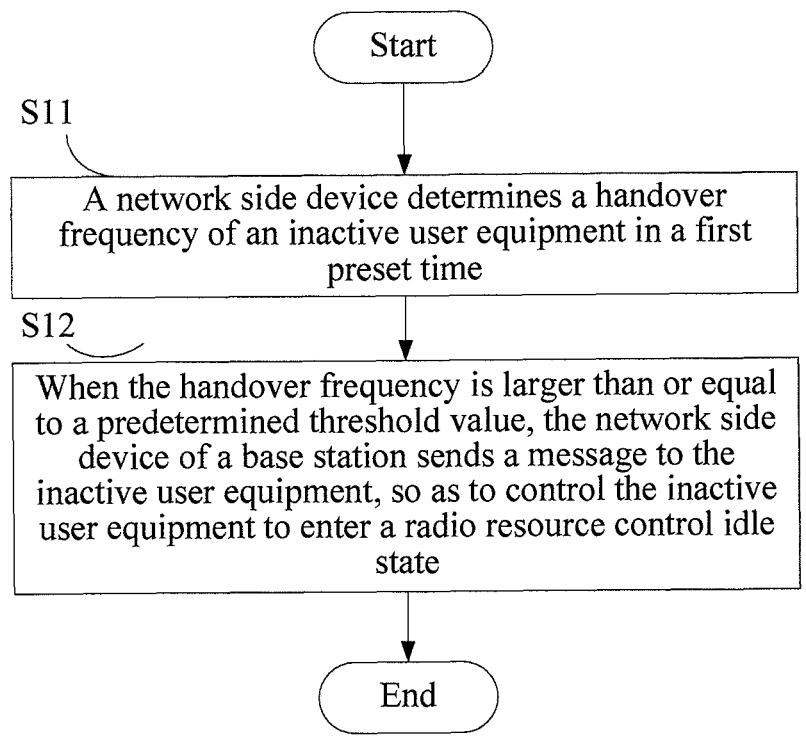
FIG. 1 is a flowchart of a method for reducing handover signaling according to an embodiment of the present invention.

FIG. 1 is a flowchart of a method for reducing handover signaling in an LTE system according to an embodiment of the present invention.

It can be seen that the method according to the embodiment of the present invention includes the following steps.

Step S11: A network side device determines a handover frequency of an inactive user equipment in a first preset time. Herein, the handover frequency may be determined based on the number of handovers performed by the user equipment in the first preset time. For example, currently, the UE may carry information of 16 handover cells, and the information of these handover cells includes residence time of the UE in the cell. A base station may obtain the number of handovers according to which cells the UE resides at in the first preset time, so as to estimate the handover frequency of the UE. Herein, the network side device may be a corresponding device in various communication systems, for example, may be an eNode B in an LTE system, a Node B in a UMTS system or a base transceiver station (Base Transceiver Station, BTS) in a GSM system, or a network controller in a UMTS system or GSM system, or the like.

In addition, it should be noted that, in the embodiment of the present invention, the inactive user equipment refers to a user equipment transferring no data packet, and sometimes, is called a deactivated user equipment.

Step S12: When the handover frequency is larger than or equal to a predetermined threshold value, the network side device of the base station sends a message to the inactive user equipment, so as to control the inactive user equipment to enter a radio resource control idle state. As described above, in the prior art, entry of the inactive user equipment into the RRC idle state is controlled according to a value of a UE inactivity timer, while in this embodiment, when the handover frequency reaches the predetermined threshold value, the user equipment may be set to the RRC idle state without considering the value of the user equipment inactivity timer. By adopting this method, the quantity of handover signaling may be remarkably reduced.

According to an implementation form, the user equipment may immediately release an RRC connection and enter the radio resource control idle state after receiving the message. It may also be that, a second preset time may be carried in the message, or a second preset time may be specified in advance, and the inactive user equipment releases the RRC connection and enters the radio resource control idle state after the second preset time after receiving the message.

According to an implementation form, in the LTE system, the message is an RRC connection release message RRC Connection Release. It is easily figured out that, an existing message may be used in another system, or a corresponding new message may also be designed with a function of notifying the user equipment to enter the RRC idle state.

Herein, the first preset time and the number of handovers may be configured according to different requirements of a system. When the handover frequency of the UE is larger than a certain value, the UE may be enabled to enter the RRC idle state.

In the method of this embodiment, when a handover frequency reaches a certain value, a UE may be set to an RRC idle state; therefore, the quantity of handover signaling during a movement process of an inactive UE may be reduced, and an overhead of handover signaling is reduced, thereby reducing power consumption of the UE and improving power saving performance of the UE.

Correspondingly, according to an embodiment of the present invention, a network side device is provided.

Figure 2:
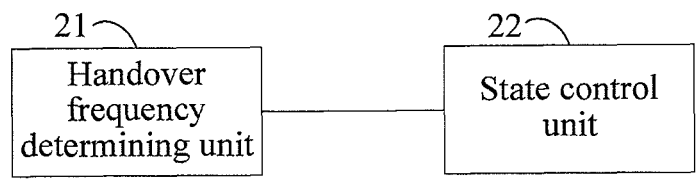
FIG. 2 is a schematic block diagram of a network side device for reducing handover signaling according to an embodiment of the present invention.

FIG. 2 is a schematic block diagram of a network side device according to an embodiment of the present invention.

It can be seen from FIG. 2 that, the network side device according to the embodiment of the present invention includes: a handover frequency determining unit 21, configured to determine a handover frequency of an inactive user equipment in a first preset time; and a state control unit 22, configured to: when the handover frequency determining unit determines that the handover frequency is larger than or equal to a predetermined threshold value, send a message to the inactive user equipment, so that the inactive user equipment enters a radio resource control idle state. The handover frequency determining unit 21 determines the handover frequency based on the number of handovers performed by the user equipment in the first preset time. The first preset time and the number of handovers may be configured according to different design requirements of a system. When the handover frequency of the UE is larger than a certain value, the UE is enabled to enter the RRC idle state.

According to an implementation form, the network side device is an eNode B in an LTE system, a Node B in a UMTS system or a BTS in a GSM system, or a network controller in a UMTS system or GSM system.

According to an implementation form, the state control unit 22 may specifically include a first state control subunit or a second state control subunit, where the first state control subunit is configured to: when the handover frequency is larger than or equal to the predetermined threshold, send a message to the inactive user equipment, so that the inactive user equipment immediately releases a radio resource control RRC connection and enters the radio resource control idle state after receiving the message; the second state control subunit is configured to: when the handover frequency is larger than or equal to the predetermined threshold, send a message to the inactive user equipment, so that the inactive user equipment releases the radio resource control RRC connection and enters the radio resource control idle state after a second preset time after receiving the message.

According to an implementation form, the message is an RRC connection release message.

For specific description about the foregoing content, reference may be made to the relevant content in the method part, and details are not repeatedly described herein.

By using the network side device of this embodiment, when a handover frequency reaches a certain value, a UE is set to an RRC idle state; therefore, the quantity of handover signaling during a movement process of an inactive UE may be reduced, and an overhead of handover signaling is reduced, thereby reducing power consumption of the UE and improving power saving performance of the UE.

Persons skilled in the art should understand that, division of apparatuses and modules in the embodiments of the present invention is functional division, and an actual specific structure may be a division or combination of the foregoing functional modules.

Solutions recorded in content of the claims also fall within the protection scope of the embodiments of the present invention.

Persons of ordinary skill in the art should understand that all or part of the processing in the foregoing method embodiments may be implemented by a program instructing relevant hardware. The program may be stored in a computer readable storage medium.

The foregoing description is merely exemplary embodiments of the present invention, but is not intended to limit the protection scope of the present invention. Any modification, equivalent replacement, and improvement made within the spirit and principle of the present invention shall fall within the protection scope of the present invention.

What is claimed is:

1. A method for reducing handover signaling, the method comprising:
    determining, by a network side device, a handover frequency of an inactive user equipment in a first preset time; and
    when the handover frequency is larger than or equal to a predetermined threshold, sending, by the network side device, a message comprising a second preset time to the inactive user equipment, so that the inactive user equipment enters a radio resource control (RRC) idle state after the second preset time, wherein the message is an RRC connection release message.

2. The method according to claim 1, wherein the network side device is a one of an eNode B in a long term evolution (LTE) system, a Node B in a universal mobile telecommunications system (UMTS), a base transceiver station (BTS) in a global system for mobile communications (GSM) system or a network controller in a UMTS system or a GSM system.

3. The method according to claim 1, wherein sending, by the network side device, the message to the inactive user equipment, so that the inactive user equipment enters a radio resource control idle state comprises:
    sending, by the network side device, the message to the inactive user equipment, so that the inactive user equipment releases an RRC connection and enters the RRC idle state after the second preset time after receiving the message.

4. The method according to claim 1, wherein determining a handover frequency of an inactive user equipment in a first preset time comprises:
    determining the handover frequency based on the number of handovers performed by the user equipment in the first preset time.

5. A network side device, comprising:
    a handover frequency determining unit, configured to determine a handover frequency of an inactive user equipment in a first preset time; and
    a state control unit, configured to: when the handover frequency determining unit determines that the handover frequency is larger than or equal to a predetermined threshold, send a message comprising a second preset time to the inactive user equipment, so that the inactive user equipment enters a radio resource control (RRC) idle state after the second preset time, wherein the message is an RRC connection release message.

6. The network side device according to claim 5, wherein the network side device is a one of an eNode B in a long term evolution (LTE) system, a Node B in a universal mobile telecommunications system (UMTS), abase transceiver station (BTS) in a global system for mobile communications (GSM) system or a network controller in a UMTS system or a GSM system.

7. The network side device according to claim 5, wherein the state control unit comprises a second state control subunit, wherein
    the second state control subunit is configured to: when the handover frequency is larger than or equal to the predetermined threshold, send the message to the inactive user equipment, so that the inactive user equipment releases an RRC connection and enters the RRC idle state after the second preset time after receiving the message.

8. The network side device according to claim 5, wherein the handover frequency determining unit is configured to determine the handover frequency based on the number of handovers performed by the user equipment in the first preset time.

9. A network side device, comprising:
    at least one processor; and
    a memory coupled to the at least one processor;
    wherein the at least one processor is configured to:
        determine a handover frequency of an inactive user equipment in a first preset time; and
        when the handover frequency is larger than or equal to a predetermined threshold, send a message comprising a second preset time to the inactive user equipment, so that the inactive user equipment enters a radio resource control (RRC) idle state after the second preset time, wherein the message is an RRC connection release message.

10. The network side device according to claim 1, wherein the network side device is a one of an eNode B in a long term evolution (LTE) system, a Node B in a universal mobile telecommunications system (UMTS), a base transceiver station (BTS) in a global system for mobile communications (GSM) system or a network controller in a UMTS system or a GSM system.

11. The network side device according to claim 9, wherein when the handover frequency is larger than or equal to a predetermined threshold, the at least one processor is configured to:
    send the message to the inactive user equipment, so that the inactive user equipment releases an RRC connection and enters the RRC idle state after the second preset time after receiving the message.

12. The network side device according to claim 9, wherein the at least one processor is configured to determine the handover frequency based on the number of handovers performed by the user equipment in the first preset time.

13. A method for reducing handover signaling by a user equipment (UE), comprising:
    in response to the UE being inactive for a first preset time:
        receiving, by the UE, a message comprising a second preset time from a network side device, the message received from the network side device in response to the network side device determining that a handover frequency of the inactive UE in the first preset time is larger than or equal to a predetermined threshold, wherein the message is a radio resource control (RRC) connection release message; and entering, by the UE, an RRC idle state after the second preset time.

* * * * *